United States Patent
Stinzendoerfer et al.

(10) Patent No.: US 9,669,343 B2
(45) Date of Patent: *Jun. 6, 2017

(54) AIR FILTER OPERABLE FOR FILTERING CABIN AIR IN VEHICLES, AGRICULTURAL MACHINERY, CONSTRUCTION EQUIPMENT AND OTHER WORK MACHINES

(71) Applicant: MANN+HUMMEL GMBH, Ludwigsburg (DE)

(72) Inventors: Joachim Stinzendoerfer, Speyer (DE); Angelika Gohle, Schwegenheim (DE); Michael Handstein, Lingenfeld (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,641

(22) Filed: Mar. 7, 2016

(65) Prior Publication Data
US 2016/0206987 A1 Jul. 21, 2016

Related U.S. Application Data

(63) Continuation of application No. 13/939,678, filed on Jul. 11, 2013, now Pat. No. 9,296,278.

(60) Provisional application No. 61/733,550, filed on Dec. 5, 2012.

(30) Foreign Application Priority Data

Jul. 11, 2012 (DE) .................... 10 2012 013 671

(51) Int. Cl.
| | | |
|---|---|---|
| B01D 53/02 | (2006.01) | |
| B01D 46/00 | (2006.01) | |
| B60H 3/06 | (2006.01) | |
| B01D 46/10 | (2006.01) | |
| B01D 46/52 | (2006.01) | |
| B01D 53/04 | (2006.01) | |

(52) U.S. Cl.
CPC ........ *B01D 46/0036* (2013.01); *B01D 46/10* (2013.01); *B01D 46/521* (2013.01); *B01D 46/525* (2013.01); *B01D 53/0407* (2013.01); *B60H 3/06* (2013.01); *B60H 3/0658* (2013.01); *B01D 2253/102* (2013.01); *B01D 2258/02* (2013.01); *B01D 2259/40001* (2013.01); *B01D 2259/4566* (2013.01); *B01D 2275/10* (2013.01); *B60H 2003/0691* (2013.01)

(58) Field of Classification Search
CPC B01D 2275/10; B01D 46/0036; B01D 46/10; B01D 46/521; B60H 2003/0691; B60H 3/06; B60H 3/0658
See application file for complete search history.

(56) References Cited

U.S. PATENT DOCUMENTS

| | | | | | |
|---|---|---|---|---|---|
| 3,873,287 A | * | 3/1975 | Barnebey | ........... | B01D 46/0013 55/479 |
| 2006/0130659 A1 | * | 6/2006 | Durst | ................. | B01D 46/0036 96/134 |

* cited by examiner

*Primary Examiner* — Christopher P Jones
(74) *Attorney, Agent, or Firm* — James Hasselbeck

(57) ABSTRACT

The invention relates to an air filter element of a passenger compartment for the driver's cab of agricultural and work machines, in particular with spraying and atomizing devices for pesticides and fertilizers, having an adsorption filter layer with activated carbon, a fine filter layer in particular for separating aerosols and a circumferential sealing for separating the raw side from the clean side during installation into a filter housing.

10 Claims, 2 Drawing Sheets

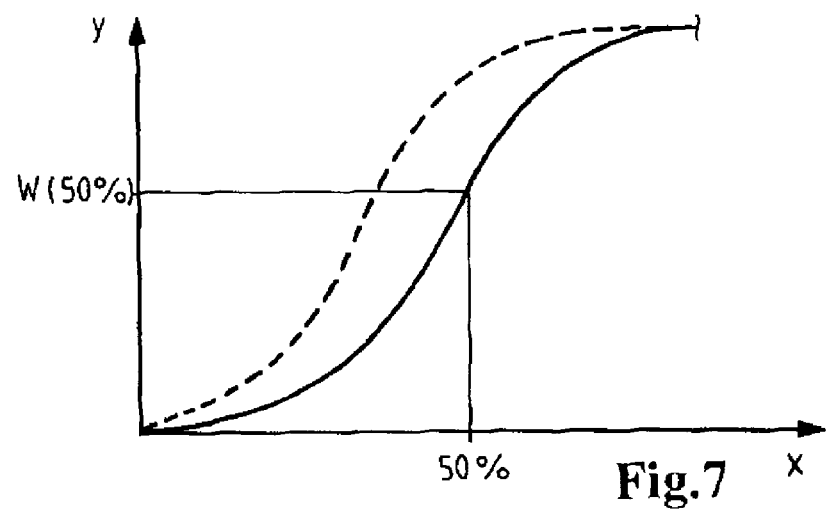
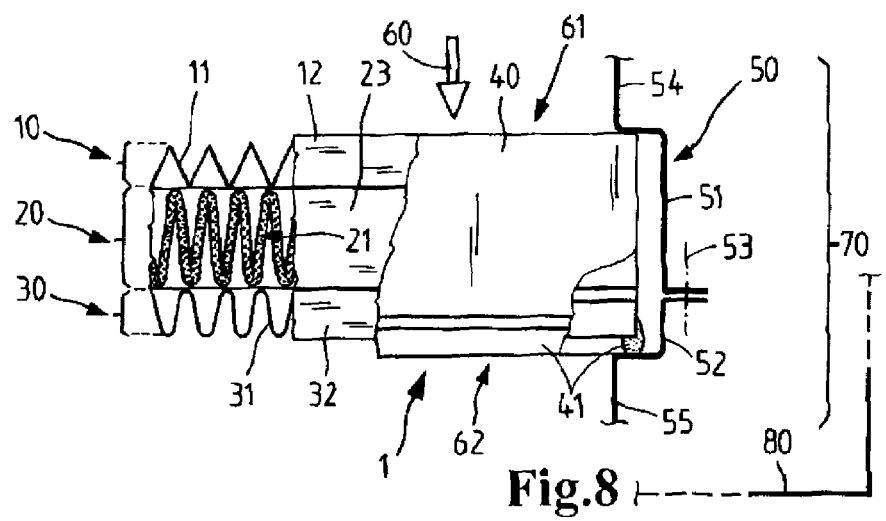
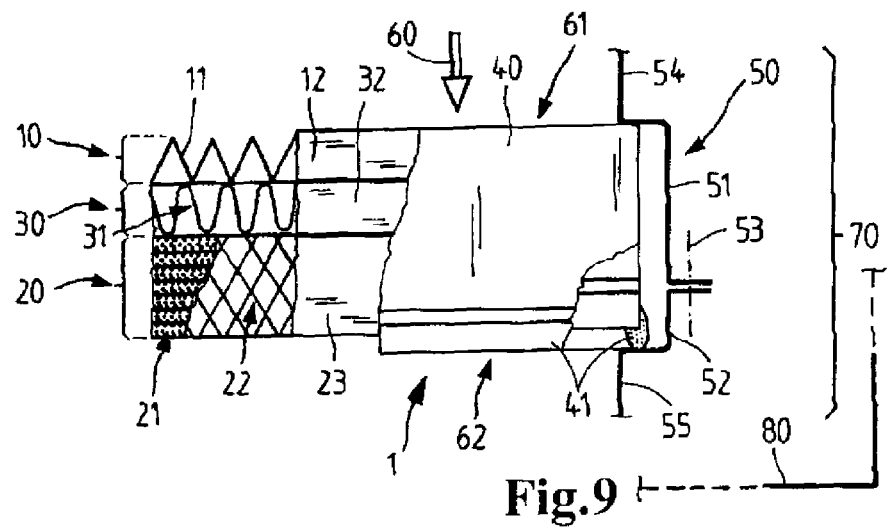

AIR FILTER OPERABLE FOR FILTERING CABIN AIR IN VEHICLES, AGRICULTURAL MACHINERY, CONSTRUCTION EQUIPMENT AND OTHER WORK MACHINES

CROSS REFERENCE TO RELATED APPLICATIONS

This application is a continuation of U.S. patent application Ser. No. 13/939,678 filed 11 Jul. 2013 which claims priority to U.S. Provisional Patent Application No. 61/733,550 filed Dec. 5, 2012 and further claims foreign priority to German Patent Application no. 10 2012 013 671.4 filed Jul. 11, 2012. The entire disclosure of U.S. application Ser. No. 13/939,678 is incorporated herein by reference.

TECHNICAL FIELD

The invention relates to a passenger compartment air filter for the air supplied to a driver's cab in agricultural machines, construction machines, and work machines.

BACKGROUND OF THE INVENTION

An air filter, which combines an outer layer of activated carbon with a layer of a HEPA filter, is known from WO 00/33940 A1.

However, the filtering effect of this filter may not be sufficient for applications in which, for example, high pesticide concentrations or (liquid) fertilizer concentrations occur in ambient air, especially when dealing with sprayers for these substances. This may be particularly disadvantageous for drivers or operators when spraying liquid pesticides and/or fungicides with agricultural or forestry tractors and self-propelled sprayers.

A mixture of liquid floating particles and air is understood as aerosol for the following embodiments.

It is, therefore, the object of this invention to provide a passenger compartment air filter, which has a better filtering effect in relation to the occurring dusts, aerosols, and vapors, in particular from pesticides and fungicides, during operation of agricultural machines.

SUMMARY OF THE INVENTION

This object is solved by a passenger compartment air filter element, comprising an ad-sorption filter layer, comprising activated carbon, in particular for separating gases, a fine filter layer, in particular for separating aerosols, and a circumferential sealing for separating the raw side from the clean side during installation into a filter housing.

The filter element according to the invention can in particular be used for the driver's cab of agricultural and work machines, in particular with spraying and atomizing devices for pesticides or fertilizers. By combining adsorption filter layer and fine filter layer, a greatly improved air quality inside the driver's cab can be reliably obtained in the above-mentioned strongly contaminated environments. In the adsorption filter layer, in particular harmful and/or unpleasant smelling gases are bound, in the fine filter layer disposed upstream or downstream of the adsorption filter layer, fine dusts, vapors and aerosols are removed from the air. The fine filter layer is preferably disposed upstream of the adsorption filter layer.

In one embodiment, an inflow-sided prefilter layer, in particular for separating dusts, is additionally provided. This prefilter layer is arranged upstream of the adsorption filter layer and the fine filter layer and disposed on the inflow side of the passenger compartment filter element. As a result, a reliable functioning of the adsorption filter layer and the fine filter layer can be ensured even in very dusty environments, and the dust load of the intake air can be reduced.

The activated carbon used may be, for example, obtained from wood or anthracite coal, it can be polymer-based, tar-based or based on coconut shell. In a preferred embodiment, ion exchange beads that are manufactured on polymer basis, for example of synthetic resins, in particular of polystyrene cross-linked with divinylbenzene, are used as basic material for the activated carbon.

In one embodiment, a hydrophobic activated carbon is used as activated carbon. As hydrophobic active carbons are in particular understood those, which have a comparatively low water absorption capacity. Preferably, an activated carbon is used which has, at a relative air humidity of 50%, a water absorption of <10 mass percent, in particular based on the adsorption branch of the isotherm. Particularly preferred, this water absorption is <5 mass percent.

In one embodiment, the activated carbon features a BET surface of larger than 400 $m^2/g$, advantageously larger than 600 $m^2/g$, preferably larger than 800 $m^2/g$, particularly preferred larger than 1000 $m^2/g$ (preferably measured according to DIN ISO 9277:2003-05). As a result, a sufficient adsorption can be ensured even on a small mounting space.

In one embodiment, activated carbon is used in loose or pourable form, for example in the form of granular or spherical or otherwise shaped particles. The activated carbon particles feature preferably activated carbon particle sizes (average diameter) between 0.1 and 1 mm, preferably 0.2 to 0.7 mm and they may, for example, have the shape of granulated activated carbon or spherical activated carbon.

In one embodiment, an unfolded or zigzag-folded filter medium can be used as prefilter layer. This can, for example, consist of cellulose, synthetic foam or fleece or comprise one single- or multi-layer combination of layers of such filter media.

A synthetic foam filter media layer for the prefilter layer may be, for example, made of a reticulated foam, in particular polyurethane foam, for example on polyether or polyester basis, or may comprise one or more layers of this foam. Volumetric weights of such foams can range from 20-70 kilograms per $m^3$.

As cellulose filter medium for the prefilter layer may, for example, a cellulose filter medium with epoxy impregnation be used. Preferably, the cellulose filter medium has a grammage of 80-140 $g/m^2$, preferably 100-120 $g/m^2$. In one preferred embodiment, the medium features a maximum pore size in the range from 30-40 μm and/or an air permeability of approx. 100-400 $l/m^2s$, preferably between 200 and 300 $l/m^2s$, measured respectively with a pressure differential of 200 Pa (measured here and in the following preferably according to DIN EN ISO 9237). By so doing, the subsequent layers can be protected from dust deposit and their functioning can therefore be ensured. In one embodiment, the impregnation percentage, i.e. the proportion of weight of the impregnating agent of the filter medium grammage is between 15 and 30%.

A combination of a spunbond fleece layer and a meltblown layer (fleece of meltblown synthetic fibers) can preferably be used as fleece filter medium for the prefilter layer. Both layers can each be made of polyamide (PA), polyester (PES) or polypropylene (PP). The fleece filter medium features preferably a grammage between 60 and 140 g/m², preferably between 80 and 120 g/m² and/or a thickness in the range of 0.5-1 mm, particularly preferred of 0.5-0.8 mm. The air permeability is further preferred in the range of 1000-2000 l/m²s, particularly preferred between 1200 and 1800 l/m²s with a pressure differential of 200 Pa.

In one embodiment, the prefilter layer in particular according to ISO 5011 features a degree of separation of 99% for fine test dust PTI in particular according to ISO 14269-4.

The prefilter layer features in one preferred embodiment a grammage of 75-125 g/m². Preferably, the filter medium of the prefilter layer features an air permeability of 100-200 l/m²s with a pressure differential of 200 Pa.

By using the prefilter layer it is possible to protect the adsorption layer and the fine filter layer against a too high dust load. As a result, its functionality (gas separation of the adsorption layer and aerosol separation of the fine filter layer) suffers only minor impairment even if the intake air is very dust-loaded.

An open-pore foam with pourable activated carbon can, for example, be used for the adsorption filter layer. In this case, reticulated foams, e.g. made of synthetic material such as polyurethane, polyurethane ether or polyurethane ester are, for example, used. Preferably, the foam's pore sizes are between 20 and 50 ppi (pores per inch) or between 0.5 and 2 pores per millimeter. Measurements are made with a comparative optical method, wherein a fully developed pore is defined as "standard pore" under the microscope and the pores emerging over a track section are compared with this standard pore and counted. Pores, which are not completely developed compared with the standard pore, are counted on a pro rata basis Preferably activated carbon particles are introduced and preferably fixed in this foam. In doing so, the activated carbon particles are preferably fixed in the foam by means of adhesive, for example by means of a two-component adhesive on polyurethane basis. This can, for example, be obtained by soaking the foam first with an adhesive and subsequently pouring activated carbon particles into the foam in particular by vibration, before the adhesive dries or hardened. In this connection, a two-component adhesive, a hotmelt adhesive or an aqueous adhesive can be used.

In one embodiment, a layer of a fixed bulk with activated carbon is used as adsorption filter layer. This can be realized in a single-layer or multi-layer structure. An arrangement, in which a carrier stratum is provided and on which a bulk layer of activated car-bon particles is fixed, is called fixed bulk. For example, an expanded synthetic grid or a layer of a flat material, for example of a particle filter medium, can be used as carrier stratum. In a preferred embodiment, a fleece of spunbond or meltblown polyester fibers, for example PET fibers (polyethylene terephthalate) or PBT fibers (polybutylene terephthalate) is used as carrier stratum. This can feature a grammage between 25-120 g/m², preferably between 50-100 g/m², particularly preferred between 65-85 g/m², and an air permeability>3000 l/m²s, preferably >5000 l/m²s with a pressure differential of 200 Pa. The air permeability is measured in particular according to ISO 9347. The bulk layer of activated carbon particles is applied on the carrier stratum and preferably fixed on the carrier stratum by means of a fine adhesive application. This is, for example, done in the form of a plurality of adhesive dots applied on the carrier stratum or by means of a net of adhesive threads which is applied between carrier stratum and bulk layer and/or between the bulk layer during the pouring and/or on the bulk layer. The bulk layer comprises preferably a layer of 100-1200 g/m² activated carbon particles on the carrier stratum. Preferably, between 800 and 1000 g/m² are used. The layer of a fixed bulk with carrier layer and bulk layer features preferably an air permeability in the range of 800-1200 l/m²s, in particular between 900 and 1100 l/m²s, and a grammage in the range of 850 to 1250 g/m², in particular between 950 and 1150 g/m² with a layer thickness in particular in the range of 2 to 6 mm.

By so doing, a stable, easy-to-process and efficient layer of a fixed bulk is provided which can be combined by a machine to multi-layer semi-finished products.

In one embodiment, an unfolded or zigzag-folded stratum structure of a carrier stratum, a cover stratum and pourable activated carbon introduced therebetween is used for the adsorption filter layer. As a result, a semi-finished product with a carrier stratum and a cover stratum and a bulk layer disposed therebetween is formed. Such semi-finished products can, in turn, be arranged one above the other to increase the filtration performance, for example between two and 20 semi-finished products, preferably between 5 and 15 semi-finished products.

The cover stratum can be disposed directly on the bulk layer, and comprise, for example, a synthetic grid or a layer of a flat material, for example of a particle filter medium, or consist thereof. In a preferred embodiment, a fleece of spunbond or meltblown poly-ester fibers is used as carrier stratum. This can feature a grammage between 25-120 g/m², preferably between 50-100 g/m², particularly preferred between 65-85 g/m², and an air permeability>3000 l/m²s, preferably >5000 l/m²s.

In one embodiment, the adsorption filter layer features a stratum structure of several fixed bulks For example, a first layer of a fixed bulk can be placed with the side, on which the activated carbon is disposed (activated carbon side), on the activated carbon side of a second layer of fixed bulk and connected with it, for example by gluing. As a result, a semi-finished product with two carrier strata or cover strata and a bulk layer disposed therebetween is formed. Such semi-finished products can, in turn, be arranged one above the other to increase the filtration performance, for example between two and 10 semi-finished products, preferably between 3 and 7 semi-finished products. As an alternative or in combination, assemblies are also conceivable in which the carrier layer of a layer of a fixed bulk is placed on the activated carbon layer of another fixed bulk. This assembly can then be finished by a turned layer with fixed bulk or by a cover stratum. For example, between 4 and 20 layers of a fixed bulk can be arranged one above the other.

In one embodiment, the complete adsorption filter layer can form a zigzag-folded stratum structure or comprise individual, superimposed, separately folded or unfolded strata of semi-finished products or layers of fixed bulk.

Preferably, by means of the described variants several adsorption filter layers in stratum structure arranged one above the other, comprising a carrier stratum, a cover stratum and pourable activated carbon introduced therebetween, can form a complete adsorption filter layer. In particular between 2 and 30, preferably between 5 and 15 layers of semi-finished products or of fixed bulk are arranged one above the other to form the complete adsorption filter layer and optionally connected with each other sealingly by means of a fastener, for example a lateral strip made of fleece or textile, to form a partial adsorption filter. In this case, the lateral strip can be connected with the layers by means of an adhesive. As an alternative to the lateral strip, in particular a glued, injection molded or welded-on synthetic frame or a casting compound, in particular polyurethane, cast on to the layers by means of a casting mold can be used as lateral sealing.

In one embodiment, the adsorption filter layer features two areas with different activated carbon density. In this case, an area with higher activated carbon density is preferably disposed on the outflow side and an area with lower activated carbon density on the inflow side. This can, for example, be obtained by placing two layers of different foams filled with activated carbon particles on top of each other, wherein the outflow-sided layer has a higher filling level of activated carbon than the inflow-sided layer. As an alternative, and as described above in different variants, a stratum structure of layers with fixed bulks of activated carbon particles can be used, in which one or several outflow-sided layers or strata, which close in particular the stratum structure at the outflow side, have a higher activated carbon density. This can, for example, be obtained with the same materials for carrier strata, bulk layers, and cover layers by calendering the outflow-sided layers in particular before, during or after the curing of the adhesive in such a way that the stratum thickness is reduced and therefore the activated carbon density is increased. However, an activated carbon granulate, which has a higher bulk density than that one used for the layers with lower density, can be used for the layer(s) with higher activated carbon density. This can either be realized by activated carbon of different specific density or by different particle geometries. As a result, in particular a barrier layer is realized, which reliably allows the separation of residual concentrations of harmful gases. As a result, an additional safety can be provided for the user.

In one preferred embodiment, the adsorption filter layer features an outflow-sided area comprising one or several in particular calendered layers of fixed bulk. This/These layer(s) feature(s) preferably a layer of activated carbon of 100-1200 $g/m^2$ activated carbon particles on the carrier stratum. Preferably, between 800 and 1000 $g/m^2$ are used. The layer of a fixed bulk with carrier layer and bulk layer features preferably an air permeability in the range of 800-1200 $l/m^2s$, in particular between 900 and 1100 $l/m^2s$, and a grammage in the range of 850 to 1250 $g/m^2$, in particular between 950 and 1150 $g/m^2$ with a layer thickness in particular in the range of 1 to 3 mm. These layers or this layer feature particularly preferred in the outflow-sided area with higher activated carbon density primarily the same layer of activated carbon particles in relation to the grammage and/or the type of activated carbon particles than the previous, inflow-sided layers with lower activated carbon density. Furthermore, this layer or these layers feature preferably a considerable lower layer density than the previous, inflow-sided layers with lower activated carbon density. The layer thickness can, for example, be ⅔ smaller than the thickness of the previous, inflow-sided layers with lower activated carbon density, preferably between 40% and 60% of the thickness of the previous, inflow-sided layers. To achieve this, for example the layer or the layers with higher activated carbon density are compressed by calendering or by a similar method in such a way that, compared with the untreated stratum, such a reduction in thickness can be obtained. By so doing, the different areas with different activated carbon density can be made of the same basic materials, wherein only one additional calendering step is required for generating the layers with higher activated carbon density.

In one preferred embodiment, a bulk of activated carbon particles, which has compared with the previous, inflow-sided layers with lower activated carbon particles a higher bulk density, is used for the layer or the layers with higher activated carbon density. In this case, the bulk density compared with the inflow-sided layers with lower activated carbon density, is preferably 50%, particularly preferred 100% higher.

In one particularly preferred embodiment, a bulk of activated carbon particles, which has compared with the previous, inflow-sided layers with lower activated carbon particles a lower average particle diameter, in particular an at least 50% lower average particle diameter, preferably an at least 65% lower average particle diameter, is used for the layer or the layers with higher activated carbon density.

In one embodiment, the inflow-sided layers with lower activated carbon density feature activated carbon particles with a particle diameter in the range of 0.7 to 1.2 mm.

In one embodiment, the layer or layers with higher activated carbon density feature a bulk of activated carbon particles with a particle diameter in the range of 0.3 to 0.7 mm.

With the described embodiments of the adsorption filter stage, in particular a uniform distribution of the activated carbon is achieved, which is also ensured for example during the operation under vibration load. By so doing, a contribution for the provision of a reliable filter element can be made.

With a filter medium according to the invention for an adsorption filter layer it is possible to provide in particular a passenger compartment filter element with an adsorption filter layer that can be easily processed. It is in particular possible to provide a passenger compartment filter element that achieves a test gas concentration below 10 μg/g at the outflow side according to the cyclohexane method according to EN 12941:1998 with a test duration of 70 min measured according to EN 15695-2:2009.

In one embodiment, an unfolded or zigzag-folded filter medium with glass fibers in a glass fiber layer is used as fine filter layer. In this connection, a glass fiber fleece or glass fiber paper can, for example, be used. This features preferably a one-sided or two-sided laminated cover stratum made of a spunbonded fleece. As a result, in particular a mechanical protection of the often very sensitive glass fiber medium is achieved. This is in particular advantageous if the glass fiber layer is folded, for thanks to this in particular the medium can be protected against damages, which could lead to local leakages or cracks. Furthermore, such cover strata allow to improve the mechanical strength of the fine filter layer.

In one embodiment of the fine filter layer, the glass fibers feature a fiber diameter in the range of 800 nm to 5 μm. Preferably, 90% of the fibers feature a fiber diameter within this range. Preferably, fibers with fiber diameters are primarily provided in the complete fiber diameter area. Preferably, the average fiber diameter is available within the mentioned area. The fiber diameters can, for example, be measured according to the methods described in DE 10 2009 043 273 A1 or US 2011/0235867 A1. Preferably, the filter medium of the fine filter layer features a grammage between 60 and 100 $g/m^2$, particularly preferred between 75 and 90 $g/m^2$. The glass fiber layer features preferably a thickness of 0.2-1 mm, particularly preferred of 0.3-0.6 mm. Particularly preferred is the use of a glass fiber layer, which generates a resistance in the range of 300-600 Pa, preferably between 400 and 500 Pa with an inflow velocity of 7.5 cm/s. The air permeability (permeability) is preferably in the range from 25 to 45 $l/m^2s$, with a pressure loss of 200 Pa. The pressure loss with a flow velocity of 5.3 cm/s is preferably in the range of 200-700 Pa, particularly preferred between 450 and 600 Pa or as an alternative between 270-480 Pa. The pore size can preferably be in the range between 5 and 12 µm, particularly preferred between 8 and 10 µm.

In one embodiment, the spunbonded fleeces of the cover stratum(strata) are made in particular of a polyester or polypropylene or polyamide as material.

In one embodiment, the spunbonded fleeces of the cover stratum(strata) feature grammages in the range of 10 and 250 g/m², preferably 20 to 60 g/m² and particularly preferred 30-34 g/m². Preferred stratum thicknesses for the cover strata are in the range of 0.1 to 0.3 mm.

In one embodiment, the spunbonded fleece of the cover strata is made of continuous fibers, which are stretched by means of temperature-controlled air and/or godets and deposited in a tangled manner on a conveyor belt. A calendering process may follow optionally for generating a fiber composite and/or for influencing the fleece surfaces.

Instead of glass fibers, synthetic fibers can also be used for the fine filter layer. In one example of an embodiment, such a synthetic HEPA medium is used instead of the described glass fiber media. In this case, polyester or polypropylene or polyamide can, for example, be used as material, in this case, the fiber layers are preferably designed in fleece shape and, for example, manufactured in the electro-spinning process, in the meltblown process or in any other manner. In this case, an electret medium is preferably used. Due to the material properties of synthetic filter media, cover and protective layers are advantageously not needed. Preferably, a layer of meltblown fleece made of polyester with a grammage of, for example, 80-160 g/m², preferably between 80 and 120 g/m² and a thickness of, for example, approx. 0.4 to 1 mm is used. Furthermore, it is preferably applied to a carrier layer. As carrier layer is, for example, a synthetic sup-port grid or a spunbonded fleece layer taken into account. The other properties can correspond to those of the described fine filter layers with glass fibers.

In one embodiment, the prefilter layer and the fine filter layer are integrated in a filter bellows with in particular directly superimposed layers of a prefilter medium and a fine filter medium.

In one embodiment, one cover stratum is laminated only one-sided onto the glass fiber layer, the prefilter medium is directly laminated onto the other side. This layer combination can either be integrated in a flat manner into the passenger compartment filter element or zigzag-folded as complete layer combination and form a bellows. By so doing, a passenger compartment air filter element with several filter levels can be provided with little installation effort and on a small mounting space.

Cover strata and/or prefilter layer can be applied to the glass fiber layer in different ways. In this connection, for example sprayed adhesives, for example in aqueous suspension, for example on PU basis, are used. As an alternative, sprayed, in powder application processes or applied hotmelt adhesives, for example in the form of adhesive fleeces or grids, can be used between the layers, which melt in a fixing step during calendering and harden subsequently and thus realize a durable connection. In this way, a reliable connection can in particular be realized between glass fiber layer and cover strata, which allows a folding of the filter medium.

With a filter medium according to the invention for a fine filter layer it is possible to pro-vide in particular a passenger compartment filter element with fine filter layer that can, in particular, be easily processed to form a bellows. In particular, a passenger compartment filter element can be provided, that achieves an aerosol penetration of 0.05% measured according to EN 15695-2:2009.

In the filter element according to the invention, prefilter layer and/or the adsorption filter layer and/or the fine filter layer can each form a separate partial filter element or completely or partially connected with each other consecutively in layers.

In a preferred embodiment, the passenger compartment filter element comprises consecutively at least two of the three partial filter elements prefilter layer, adsorption filter layer, and fine filter layer. They feature each preferably a lateral strip surrounding the circumferential narrow sides, which is sealingly connected with the respective partial filter layer. The lateral strip can be a textile lateral strip or made of fleece.

Preferably, the sides of the filter layer, which are not flowed through, are in this case designated as narrow sides. In this case, the narrow sides surround the inflow and out-flow sides or surfaces, respectively, In a media structure which is formed of zigzag-shaped folds of a medium, the notion narrow sides comprises the surfaces (front faces) formed by the zigzag-shaped course of two edges of the medium as well as the end surfaces running parallel to the fold edges.

In one embodiment, the prefilter layer and/or the adsorption filter layer and/or the fine filter layer are directly one above the other and zigzag-folded as unit.

In one embodiment, the partial filter elements for forming the passenger compartment filter element are in particular placed directly one above the other and sealingly connected by means of a frame, in particular by means of a lateral strip surrounding the common narrow side, in particular made of fleece or textile, which can be welded or glued with the partial filter elements.

As an alternative, in particular an injection molded synthetic frame can be provided. It can either be prefabricated and receive the partial filter elements which are glued in the frame or welded. As an alternative, the frame can be designed as overmolded frame which is formed in this way that the partial filter elements are laid into a mold and subsequently overmolded with an injection molded frame, wherein the material is undetachably connected with the partial filter element during hardening.

Furthermore, as an alternative, the frame can be formed of a casting compound of polyurethane (PUR) or another pourable polymer, in particular of a foamed polyurethane, i.e. polyurethane foam.

In one embodiment, the sealing is made of a circumferential sealing profile of a polymer, in particular of a foamed, in particular closed-pore foam for example of polyurethane foam. If the frame is also made of such a material, the sealing can be designed as one piece with the frame. Preferably, the sealing features a hardness in the range between 5 and 45 Shore A, particularly preferred of 13+/−4 Shore A.

In a preferred embodiment, the sealing is axially or radially sealingly compressible or fixable between two housing components of a filter housing.

The invention relates to a passenger compartment air filter system for the driver's cab of agricultural and work machines, in particular with spraying and atomizing devices for pesticides or fertilizers, comprising a passenger compartment air filter element according to the invention and a housing with an air intake and an air outlet, in which the passenger compartment air filter element sealingly separates the inlet side from the outlet side.

The invention relates further to a driver's cab of a vehicle or a work machine comprising a passenger compartment air filter system according to the invention as well as the use of a passenger compartment air filter element according to the invention or a passenger compartment air filter system in a driver's cab of a vehicle or a work machine.

Further possible implementations of the invention comprise also not explicitly mentioned combinations of characteristics of the passenger compartment air filter element or the passenger compartment air filter system described previously or in the following with respect to the examples of an embodiment. In this context, the person of skill in the art will add or modify also individual aspects as improvements or complements to the respective basic form of the invention.

Further embodiments of the invention are subject of the subclaims as well as of the examples of an embodiment of the invention described in the following. Furthermore, the invention is explained in detail based on examples of an embodiment with reference to the attached figures.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
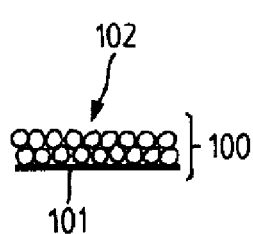
Figure 2:
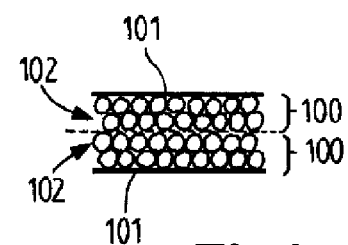
Figure 3:
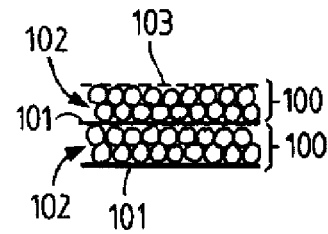
Figure 4:
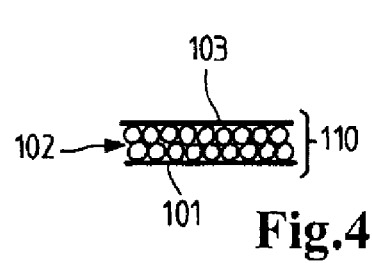
Figure 5:
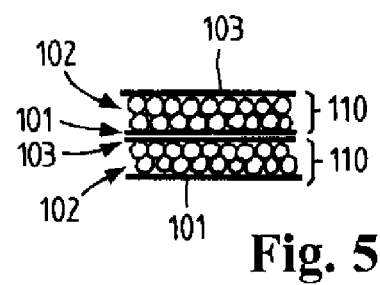
Figure 6:
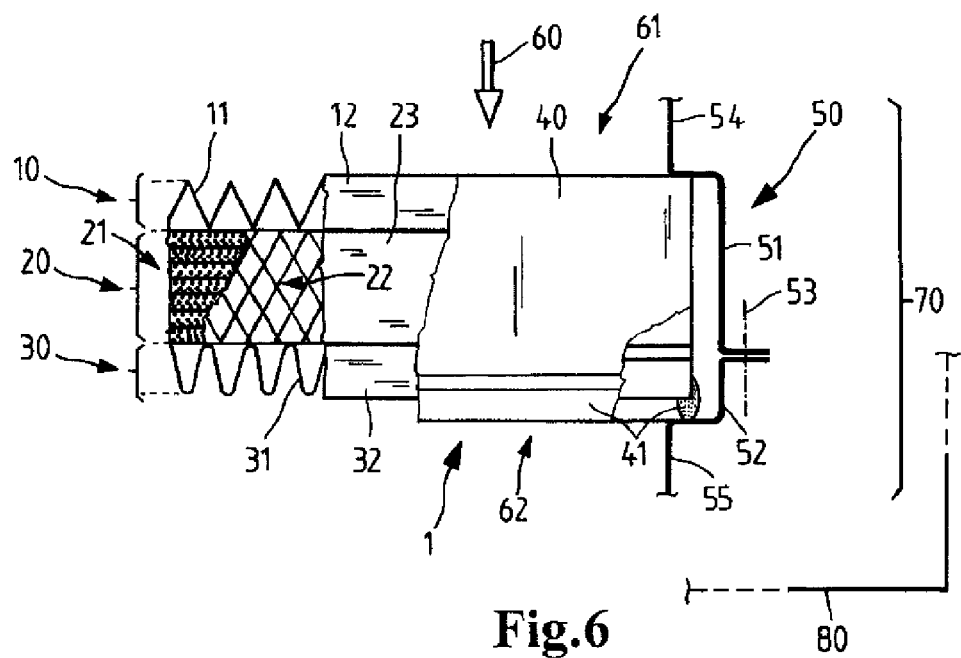

It is shown in:

FIG. 1: a layer of a fixed activated carbon bulk on a carrier stratum;

FIG. 2: a first embodiment of a semi-finished product of an adsorption filter layer made of two layers according FIG. 1;

FIG. 3: a second embodiment of a semi-finished product of an adsorption filter layer made of two layers according FIG. 1;

FIG. 4: a semi-finished product of an adsorption filter layer made of a layer ac-cording to FIG. 1 and of a cover stratum;

FIG. 5: an adsorption filter layer made of two layers of a semi-finished product according FIG. 4;

FIG. 6: a passenger compartment air filter system with an embodiment of a passenger compartment air filter element;

FIG. 7: as an example the adsorption and desorption properties for water of an activated carbon material;

FIG. 8: a passenger compartment air filter system with a further embodiment of a passenger compartment air filter element; and FIG. 9: a passenger compartment air filter system with a further embodiment of a passenger compartment air filter element.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

A possible structure of an adsorption filter layer can be taken from FIGS. 1-5. FIG. 1 shows a layer 100 of a fixed bulk of activated carbon particles, comprising a carrier stratum 101 and a bulk layer 102 with activated carbon particles.

Two of these layers can be connected in different ways to form semi-finished products, which can form a single-layer or multi-layer adsorption filter layer. In the embodiment according to FIG. 2, two such layers 100 are arranged one above the other in such a way that the bulk layers 102 are superimposed, wherein a semi-finished product is formed, which is limited on both sides by the carrier layers 101. Several of these semi-finished products can be placed one above the other to form a complete adsorption filter layer.

In the embodiment according to FIG. 3, two such layers 100 are arranged one above the other in the same orientation, however, a greater number of such layers 100 can be arranged one above the other in this way. To form a closed adsorption filter layer, a cover stratum 103 can be applied to the bulk layer 102

FIG. 4 shows an embodiment of a semi-finished product 110 with a layer 102 of a fixed bulk of activated carbon particles, which are applied to a carrier stratum 101 and covered by a cover stratum 103. The semi-finished product 110 can form a complete adsorption filter layer either in single-layer or, as shown in FIG. 5, in a two- or multi-layer assembly of superimposed semi-finished products 110.

The bulk layers 102 in the embodiments are connected by means of fine nets of adhesive threads with the respective carrier and cover strata, however, other connection types can be chosen.

FIG. 6 shows an embodiment of a passenger compartment air filter system 70 in a driver's cab 80 for vehicles, agricultural machines, construction machines, and work machines. The passenger compartment air filter system 70 comprises a housing 50 with a first housing half 51 and a second housing half 52, which are connected with each other by locking means 53. A passenger compartment air filter element 1 (filter element) is disposed in the housing 50 in such a way that the raw side 61 is sealingly separated from the clean side 62. The filter element features a circumferential sealing 41, which is sealingly compressed by tensioning the filter element 1 between the housing halves axially, i.e. in flow direction 60, against a sealing surface of the second housing half. The sealing 41 is designed as a profile poured into a mold of closed polyurethane foam with a Shore hardness of 13 Shore A. The filter element 1 comprises an inflow-sided prefilter layer 10, which defines the raw side, an outflow-sided fine filter layer 30, which defines the clean side, and an adsorption filter layer 20 disposed therebetween. This can either, as shown at the left with reference numeral 21, be made of a multi-layer structure of superimposed layers of fixed bulks of activated carbon particles on carrier layers or, as indicated besides at the right, of an open-pore foam with poured-in activated carbon. According to the variant shown under reference numeral 21, seven double layers of fixed bulks, as shown in FIG. 2, are superimposed in this embodiment, which can comprise each a carrier layer made of spunbonded fleece of meltblown PET fibers (polyethylene terephthalate) with a grammage of 85 $g/m^2$ and an air permeability of 5500 $l/m^2s$ with 200 Pa. A bulk of activated carbon beads of approx. 800 $g/m^2$ is applied on it by means of an adhesive on polyurethane basis applied in thin fibers. This bulk features, with a relative air humidity of 50%, a water absorption of approx. 9 mass percent and a BET surface of 900 m²/g. The activated carbon particles have a diameter in the range of 0.2 to 0.7 mm. According to the variant shown under reference numeral 22, the adsorption filter layer is made of activated carbon particles, which comprises an open-pore (reticulated) foam of polyurethane with a pore density of an average of 40 ppi (pores per inch) or 1.6 pores per millimeter, into which the activated carbon particles used also above in variant 21 with fixed bulks are poured and fixed by means of a two-component adhesive on polyurethane basis, in which foam is fixed. Both variants feature an extension of 30 mm in through-flow direction.

The prefilter layer 10 is made of a zigzag-folded cellulose filter medium 11 with epoxy impregnation, which has a grammage of 90 g/m², a maximum pore size of 40 µm, an air permeability of approx. 200 l/m²s measured with a pressure differential of 200 Pa.

The fine filter layer 30 is made of a zigzag-folded HEPA glass fiber medium 31 with a stratum of a glass fiber paper with cover strata laminated on both sided made of a spun-bonded fleece of polyester. The glass fibers feature different fiber diameters in the range of 800 nm to 5 µm. The grammage of the glass fiber paper is preferably 80 g/m². The cover stratum has grammages of approx. 30 g/m² and stratum thicknesses of approx. 0.2 mm and is connected with the glass fiber paper by means of a calendering process.

Prefilter layer 10, fine filter layer 30, and adsorption filter layer 20 feature each a sealingly circumferential lateral strip 12, 23, 32 of polyester nonwoven and, placed one above the other, they are connected by means of another lateral strip 40 to form a filter element 1, wherein the lateral strip 40 sealingly connects the partial filter layers 10, 20, 30 with each other. On the other hand, the sealing 41 is foamed onto the lateral strip 40, with which the raw side can be separated from the clean side in the housing 50.

As an example, FIG. 7 shows the adsorption and desorption properties for water of an activated carbon material based on isotherms. Plotted on the x-axis is the relative humidity in percentage and on the y-axis the water absorption W in mass percent relating to the mass of the activated carbon. Typically, the measurement is carried out at normal temperature and normal pressure. The maximum water absorption for many types of activated carbon is in the range of 20 to 50 mass percent. Typically, activated carbon shows a hysteresis behavior with adsorption and desorption, as shown in FIG. 6. The solid line shows the process of water absorption with adsorption and is called adsorption branch. The dashed line shows the process of water absorption with desorption and is called desorption branch. According to the invention, the water absorption W (50%) with a relative humidity of 50% is smaller than 10 mass percent, preferably smaller than 5 mass percent, measured on the solid adsorption branch of the isotherm.

FIGS. 8 and 9 each show variations of the embodiment shown in FIG. 6, wherein the variation shown in FIG. 8 is characterized by the fact that as adsorption filter layer 20 a single- or multi-layer stratum structure of fixed bulks of activated carbon is formed, which is zigzag-folded, in particular in such a way that opposing fold flanks contact one another so that no gap is formed between the folds.

The variant shown in FIG. 9 corresponds to the embodiment shown in FIG. 6, wherein in that case the fine filter layer 30 is disposed between the prefilter layer 10 and the ad-sorption filter layer 20. This has the advantage that the adsorption filter layer 20 is charged with an even lower amount of particles so that its efficiency can well be maintained. Of course, the adsorption filter layer can also be designed in this variant as well as in the embodiment shown in FIG. 6 as shown in FIG. 8.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A passenger compartment air filter element for filtering an air flow in a driver's cab of agricultural and work machines, comprising:
   an adsorption filter layer including:
      a plurality of individual adsorption layers, each having:
         a carrier stratum layer of a flat layer of filter medium or synthetic grid; and
         a bulk layer of activated carbon particles arranged on one side of the carrier stratum layer, the bulk layer of activated carbon particles layered onto the carrier stratum layer and fixed to the carrier stratum layer by an adhesive;
      wherein the plurality of individual adsorption layers are layered directly upon immediately adjacent individual absorption layers, onto either the carrier stratum layer or the bulk layer of active carbon of the immediately adjacent individual absorption layers, to form the adsorption filter layer;
   a circumferential sealing element operable for sealably separating a raw side from a clean side of a filter housing when installed into the filter housing;
   an inflow-sided prefilter layer having a porosity configured to separate dust from the airflow;
   a fine filter layer configured for separating aerosols from the air flow, the fine filter layer arranged downstream of the adsorption filter layer at an outflow side of the adsorption filter layer;
   wherein at least one of the following layers is embodied as a separate partial filter element: the prefilter layer, the plurality of individual adsorption filter layers and/or the fine filter layer.

2. The passenger compartment air filter element according to claim 1, wherein
   the fine filter layer is a zigzag-folded filter medium of glass fiber fleece;
   wherein the fine filter layer includes at least one cover strata made of a spunbonded fleece.

3. A passenger compartment air filter element for filtering an air flow in a driver's cab of agricultural and work machines, comprising:
   an adsorption filter layer including:
      a plurality of individual adsorption layers, each having:
         a carrier stratum layer of a flat layer of filter medium or synthetic grid; and a bulk layer of activated carbon particles arranged on one side of the carrier stratum layer, the bulk layer of activated carbon particles layered onto the carrier stratum layer and fixed to the carrier stratum layer by an adhesive;

wherein the plurality of individual adsorption layers are layered directly upon immediately adjacent individual absorption layers, onto either the carrier stratum layer or the bulk layer of active carbon of the immediately adjacent individual absorption layers, to form the adsorption filter layer;

a circumferential sealing element operable for sealably separating a raw side from a clean side of a filter housing when installed into the filter housing;

an inflow-sided prefilter layer having a porosity configured to separate dust from the airflow;

wherein the inflow-sided prefilter layer is an unfolded or zigzag-folded filter medium made of cellulose, synthetic foam or synthetic fleece;

wherein the prefilter filter layer comprises two layers, in combination:
a spunbond fleece layer of polyamide (PA), polyester (PES) or polypropylene (PP); and
a meltblown fleece layer of polyamide (PA), polyester (PES) or polypropylene (PP).

4. The passenger compartment air filter element according to claim 3, wherein
at least one of the following layers is embodied as a separate partial filter element: the prefilter layer, the plurality of individual adsorption filter layers and/or a fine filter layer configured to separating aerosols from the air flow and arranged downstream of the adsorption filter layer at an outflow side of the adsorption filter layer.

5. The passenger compartment air filter element according to claim 4, comprising:
a frame or a lateral strip arranged directly on and fixed onto one or more lateral sides of the air filter element;
wherein the circumferential sealing element is arranged on the frame or on the lateral strip;
a plurality of the separate partial filter elements, each according to claim 4;
wherein the plurality of separate partial filter elements forming the passenger compartment filter element are stacked adjacently one above the other and sealingly connected and secured together by the frame or the lateral strip surrounding and joining common narrow sides of the plurality of separate partial filter elements;
wherein the frame or the lateral strip is injection molded onto, or welded to or glued onto the narrow sides of the plurality of separate partial filter elements.

6. The passenger compartment air filter element according to claim 5, wherein
the sealing element includes a circumferential sealing profile comprising any of: a foamed, closed-pore polymer or a closed-pore polyurethane foam.

7. The passenger compartment air filter element according to claim 5, wherein
the plurality of individual adsorption filter layers are joined together by a first sealingly circumferential lateral strip secured to the plurality of individual adsorption filter layers and circumferentially surrounding and joining together the plurality of individual adsorption filter layers forming a first partial filter element;
wherein the prefilter layer includes a second sealingly circumferential lateral strip secured to the prefilter layer and circumferentially surrounding the prefilter layer forming the second partial filter element;
wherein the fine filter layer includes a third sealingly circumferential lateral strip secured to the fine filter layer and circumferentially surrounding the fine filter layer forming the second partial filter element;
wherein an additional circumferential lateral strip or plastic frame is overlaid directly onto and secured to the first, second and third circumferential lateral strips, joining together the first, second and third partial filter elements to form a complete filter element;
wherein the circumferential sealing element is arranged on the additional circumferential lateral strip or plastic frame.

8. The passenger compartment air filter element according to claim 1, wherein
the fine filter layer is a zigzag-folded filter medium of glass fiber fleece;
wherein the fine filter layer includes at least one cover strata made of a spunbonded fleece.

9. The passenger compartment air filter element according to claim 5, wherein
the plurality of individual adsorption filter layers are joined together by a first sealingly circumferential lateral strip secured to the plurality of individual adsorption filter layers and circumferentially surrounding and joining together the plurality of individual adsorption filter layers forming a first partial filter element;
wherein the prefilter layer includes a second sealingly circumferential lateral strip secured to the prefilter layer and circumferentially surrounding the prefilter layer;
wherein an additional circumferential lateral strip or plastic frame is overlaid directly onto and secured to the first and second circumferential lateral strips, joining together the first and second partial filter elements to form a complete filter element;
wherein the circumferential sealing element is arranged on the additional circumferential lateral strip or plastic frame.

10. The passenger compartment air filter element according to claim 5, wherein
the prefilter layer is a zigzag folded filter medium forming the first partial filter element;
wherein the plurality of individual adsorption layers are each flat, unpleated layers;
wherein plurality of individual adsorption layers are stacked directly onto and against each other forming a flat multilayer adsorption filter as a second partial filter element of the passenger compartment air filter element;
wherein the plurality of stacked individual adsorption layers are joined together to form the second partial filter element;
wherein the first separate partial filter element is arranged on an inflow face of the second partial filter element;
wherein the first and second partial filter elements are sealingly connected and secured together by the frame or the lateral strip arranged on and surrounding common narrow sides of the plurality of separate partial filter elements.

* * * * *